United States Patent Office 3,851,002
Patented Nov. 26, 1974

3,851,002
ISOMERIZATION OF DIMETHYLNAPHTHALENES
Isao Oka, Takeo Shima, Takanori Urasaki, and Makoto Ogasawara, Iwakuni, Japan, assignors to Teijin Limited, Osaka, Japan
No Drawing. Filed Aug. 28, 1972, Ser. No. 284,110
Int. Cl. C07c 5/24, 15/24
U.S. Cl. 260—668 A                                      11 Claims

ABSTRACT OF THE DISCLOSURE

A process for isomerizing dimethylnaphthalenes by contacting the same as dispersed in a carrier gas with silica-alumina catalyst at vapor phase under elevated temperatures, characterized in that the dimethylnaphthalene are contacted with the catalyst of which at least 80% by weight have particle sizes ranging from 7 to 150 mesh, at temperatures ranging from 260 to 370° C.

---

This invention relates to an improvement in the known vapor phase isomerization of dimethylnaphthalenes, wherein dimethylnaphthalenes are contacted with silica-alumina catalyst at elevated temperatures, together with a carrier gas. This improved process enables the isomerization of dimethylnaphthalenes at improved selectivity and conversion, and the production of intended isomer with industrial advantage.

Various dimethylnaphthalene isomers, such as 1,2-, 1,3-, 1,4-, 2,3-, 1,5-, 1,6-, 1,7-, 1,8-, 2,6-, and 2,7-dimethyl-naphthalenes, are known. Among those, 2,6-, and 2,7-isomers are particularly useful, since they can provide starting materials of polyesters of excellent physical and chemical properties, when they are converted to their corresponding naphthalenedicarboxylic acid.

In a known method of preparation of 2,6-dimethyl-naphthalene, 1,5- and/or 1,6-dimethylnaphthalene is isomerized, utilizing intramolecular rearrangement of methyl groups expressed by the formula below:

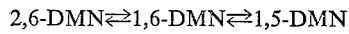

2,6-DMN⇌1,6-DMN⇌1,5-DMN (DMN stands for dimethylnaphthalene.)

It is also known that 2,7-dimethylnaphthalene can be obtained through isomerization of, for example, 1,7- and/or 1,8-dimethylnaphthalene, again utilizing intramolecular rearrangement of methyl groups as expressed by the formula

2,7-DMN⇌1,7-DMN⇌1,8-DMN

However, besides the intramolecular rearrangement reactions shown by the above formula, the intermolecular reaction between the above systems takes place. For example, in the attempts to selectively produce 2,6-DMN, hard-separable 2,7-DMN of by no means negligible amount is inavoidably concurrently formed. Similarly the attempts to produce selectively 2,7-DMN invariably encountered the concurrent formation of 2,6-DMN of which separation from 2,7-DMN is very difficult.

The polyesters obtained from such 2,6- or 2,7-naphthalenedicarboxylic acid which is the oxidation product of 2,6-DMN-containing 2,7-DMN, or 2,7-DMN-containing 2,6-DMN, exhibit deteriorated or inferior physical and chemical properties, e.g., heat stability. Therefore, it is highly desirable, in practicing either of the above known isomerization reactions, to inhibit the objectionable intermolecular rearrangement reaction, in order to promote the selective occurrence of the intended intramolecular rearrangement.

We have been engaged in research for providing an improved process to satisfy the above requirement, and discovered that the commercially available silica-alumina catalysts of approximately 5 mesh in size are useless to achieve the intended result, but that the use of silica-alumina catalyst of which at least 80% by weight have particle sizes ranging from 7–150 mesh advantageously overcomes the heretofore inavoidable disadvantages of the already described conventional isomerization reaction. Furthermore, we discovered that, in combination with the above-specified particle size of the catalyst, selection of appropriate reaction temperature is essential, which should range from 260 to 370° C. At the reaction temperatures below 260° C., the conversion is markedly deteriorated, while at the temperature above 370° C., the drop in selectivity is conspicuous. Thus at temperatures deviating from the above-specified range, the improvement intended by the subject process can never be achieved. It is again discovered that the presence of trimethylnaphthalene in any substantial amount in the isomerization reaction system inevitably causes the concurrent occurrence of objectionable intermolecular rearrangement reaction. Therefore we found it desirable to control the trimethyl-naphthalene content of the reaction system preferably to no greater than 10 mol percent. It is furthermore discovered that the subject process also achieves improvements in isomerization reaction rate and catalyst life, and that the naphthalenedicarboxylic acids derived from the product isomers provide excellent materials for polyesters.

Accordingly, an object of the present invention is to provide an improved process for isomerizing dimethyl-naphthalenes at improved selectivity and conversion.

Still many other objects and advantages of the present invention will become more apparent from the following descriptions.

The catalyst employed in the subject process is silica-alumina catalyst of which at least 80% by weight have particle sizes ranging from 7 to 150 mesh. If more than 20% by weight of catalyst have the particle sizes greater than 7 mesh, for example, as in the commercially available silica-alumina catalyst of which average particle size is approximately 5 mesh, conversion of the isomerization reaction is reduced, and the side-reaction to the intended isomerization (for example, the intermolecular reaction) occurs at an increased rate, to form more mono- and tri-methylnaphthalenes. Thus the selectivity of the reaction is impaired. Furthermore, the catalyst deterioration becomes faster, to shorten the catalyst life. Also the naphthalenedicarboxylic acids derived from the product isomers provide less appropriate materials of polyesters.

Whereas, when more than 20% by weight of the catalyst particles have the sizes smaller than 150 mesh, selectivity of the reaction is notably impaired, and the improvement intended by the invention is hardly achieved.

According to the subject process, particle size of the silica-alumina catalyst is selectable in accordance with the type of operation system of the isomerization, within the above-specified range of 7 to 150 mesh. For example, if the catalyst is used as a fixed bed, preferably the catalyst of which at least 80% by weight have the particle sizes ranging from 9–80 mesh is used. Whereas, if moving bed or fluidized bed is adopted, the catalyst's particle sizes may be finer. From the viewpoint of ease of operation and equipment facilities, fixed bed system is preferred.

The composition of silica-alumina catalyst is variable over a wide range. For example, the alumina content may vary from 0.5 to 80% by weight, that of 5 to 60% by weight being preferred.

The present process can be utilized for the selective formation of desired isomer through isomerization of other one or more dimethylnaphthalene isomers, by intramolecular rearrangement following the shift system as shown by the already given formulae. The process can be particularly advantageously applied to the starting material of which at least 80%, preferably at least 90% by weight, is the dimethylnaphthalene(s) selected from the groups consisting of 2,6 - dimethylnaphthalenes, 1,6-dimethylnaphthalenes, and 1,5-dimethylnaphthalene; or to that of which at least 80%, preferably at least 90% by weight, is the dimethylnaphthalene(s) selected from the group consisting of 2,7-dimethylnaphthalene, 1,7-dimethylnaphthalene, and 1,8-dimethylnaphthalene, to form the respectively desired dimethylnaphthalene through the isomerization by the respective intramolecular rearrangement of the described reaction systems.

According to the subject process, it is essential to adopt the reaction temperature within the range of 260–370° C., preferably 260–350° C., *inter alia*, 280–340° C., as a concurrent requirement with the use of the silica-alumina catalyst of which at least 80% by weight have the particle sizes ranging from 7 to 150 mesh.

At the initial stage of the isomerization reaction, the temperature at lower side within the above-specified range are employed, which are raised with the progressive reduction in the catalytic activity. With such a practice, the isomerization reaction can be performed with high selectivity, even at relatively high temperatures. Incidentally, when the catalyst's activity shows a deteriorating tendency during continuous usage, the reaction may be effected at temperatures somewhat exceeding 370° C. When the reaction temperature is below 260° C., the starting dimethylnaphthalene(s) enter into the reaction tube retaining the liquid phase, consequently lowering the conversion. Whereas, if it is excessively high, exceeding 370° C., objectionable intermolecular rearrangement or decomposition takes place.

In the subject process, the isomerization is performed at vapor phase. The preferred feed rate of the starting dimethylnaphthalene(s) is approximately 0.1–10 times, particularly about 0.2–2 times, by weight of the catalyst per hour. Also the preferred pressure for the reaction system ranges from the atmospheric to 10 atmospheres. When the pressure exceeds 10 atmospheres, the selectivity of isomerization reaction is extremely impaired, and the naphthalenedicarboxylic acid derived from the product isomer becomes less appropriate as a polyester material.

The reaction is effected using a carrier gas, which should be inert in the reaction system and retain the gaseous or vapor phase under the described reaction conditions. Examples of appropriate carrier gas include: inert gases such as nitrogen and carbon dioxide; hydrogen; and aliphatic, alicyclic, and aromatic hydrocarbons of 1 to 10 carbon atoms such as methane, ethane, propane, n-hexane, cyclohexane, benzene, toluene, xylene, and the like.

The carrier gas is used preferably at the quantities ranging from 0.3 to 200 molar times, particularly 0.5–100 molar times, *inter alia*, 1–20 molar times, the dimethylnaphthalene(s).

In practicing the subject process, particularly favorable results are obtained when the trimethylnaphthalene content of the dimethylnaphthalene(s) in the reaction zone is controlled to no greater than 10 mol percent. Although the reason therefor is not yet clear, it is discovered that the dimethylnaphthalene(s) of which trimethylnaphthalene content is controlled to be no higher than 10 mol percent, preferably no higher than 5 mol percent, shows the tendency to predominantly cause the desired intramolecular rearrangement reaction alone during the isomerization. Consequently the selectivity of the reaction is highly favorable, and the product isomer gives the naphthalenedicarboxylic acid suitable as a material of high quality polyester. On the contrary, the dimethylnaphthalene containing more than 10 mol percent of trimethylnaphthalene exhibits deteriorated selectivity in the isomerization reaction, and the product isomer gives naphthalene-dicarboxylic acid less appropriate as a starting material for polyester. Accordingly, in the practice wherein the isomerization product is separated from the flow of reaction mixture, and the remnant is recycled into the isomerization reaction zone for re-use, the trimethylnaphthalene which is apt to accumulate in the system is removed at an optional stage, so as to control the trimethylnaphthalene content in the isomerization reaction zone to be no higher than 10 mol percent.

If a fixed bed is utilized for practicing the subject process, the feed rate of starting dimethylnaphthalene is maintained, in terms of superficial gas velocity thereof as dispersed in the carrier gas, at no lower than 0.5 cm.$^3$/cm.$^2$ sec. (calculated at 300° C., 1 atm.), preferably no lower than 5 cm.$^3$/cm.$^2$ sec. (300° C., 1 atm.). The optimum results can be obtained when the superficial velocity in a column is maintained at no less than 20 cm.$^3$/cm.$^2$ sec. (300° C., 1 atm.) but no greater than 100 cm.$^3$/cm.$^2$ sec. (300° C., 1 atm.), since under the condition such isomerization reaction can be advanced with higher selectivity.

The removal of trimethylnaphthalene from the dimethylnaphthalene(s) can be easily effected by distillation, which can be optionally practiced before the separation of object product, for example, 2,6-, or 2,7-dimethylnaphthalene, from the isomerization reaction mixture, or after such separation and before the recycling of the mother liquor into the reaction zone.

The recycling may be practiced concurrently with the feeding of fresh dimethylnaphthalene(s) to the isomerization reaction zone. If so desired, of course the feeding of fresh starting material can be omitted in that occasion.

The separation of desired isomerization product, for example, 2,6-, or 2,7-dimethylnaphthalene, from the reaction mixture can be easily effected, either by cooling the mixture to an appropriate temperature and separating the precipitated crystalline solid, or by adding an appropriate solvent to the mixture, cooling the system, and separating the precipitated crystalline solid. Useful solvents in the latter practice include, for example, alcohols such as methanol, ethanol, isopropanol, butyl alcohol, and hexyl alcohol; aliphatic and alicyclic hydrocarbons such as n-pentane, i-pentane, n-hexane, i-hexane, cyclohexane, methylcyclohexane, 3-methylpentane, n-octane, i-octane, 3,3-dimethylhexane, 2,3-dimethylhexane and 3-ethylhexane; and aromatic hydrocarbons such as benzene, toluene, xylene, and ethylbenzene.

Hereinafter several embodiments for practicing the subject process will be explained with working examples and controls.

It should be noted that in the present specification, the terms, "conversion to the object isomer," "selectivity," and "adaptability as polyester material," are used with the following definitions, or determined through the following test methods.

(i) CONVERSION

The conversion (percent) is expressed by the value calculated as follows (F value):

$$\frac{2,6\text{-DMN}}{(1,5\text{-DMN}+1,6\text{-DMN}+2,6\text{-DMN})} \times \frac{1}{0.45} \times 100,$$

or $$\frac{2,7\text{-DMN}}{(1,7\text{-DMN}+1,8\text{-DMN}+2,7\text{-DMN})} \times \frac{1}{0.50} \times 100$$

(in which 1,5-DMN, 1,6-DMN, 2,6-DMN, 1,7-DMN, 1,8-DMN and 2,7-DMN each stands for the concentration in terms of mol percent of the pertinent DMN in the isomerization reaction mixture).

(ii) SELECTIVITY

The selectivity (percent) is expressed by the value calculated in the following manner (S value):

$$\frac{2,6\text{-DMN}}{2,6\text{-DMN} + \Delta(\text{MN} + \text{TMN})} \times 100,$$

or $$\frac{2,7\text{-DMN}}{2,7\text{-DMN} + \Delta(\text{MN} + \text{TMN})} \times 100,$$

(in which 2,6-DMN and 2,7-DMN each stands for the concentration of respective DMN in the isomerization reaction mixture, expressed by mol percent, and $$\Delta(\text{MN} + \text{TMN})$$

stands for the increase in the concentrations of monomethylnaphthalene (MN) and trimethylnaphthalene (TMN) after the isomerization reaction, also expressed by mol percent).

The adaptability as a polyester-forming material was determined by the following methods:

(1) Qualititative evaluation of 2,6-DMN

The isomerization product was cooled to 10° C., and the precipitated crystals were separated by centrifuge. The obtained cake was re-crystallized from three times the quantity thereof of methanol.

The resulting DMN was oxidized with air at 200° C. for 2 hours, in six times thereof of acetic acid, in the presence of a catalyst which was a mixture of cobalt acetate and manganese acetate, and ammonium bromide serving as a promoter. The quantities of the catalyst and promoter were, respectively, one-twentieth and one-fiftieth the DMN. The oxidation product was cooled to 25° C., and the resultant solid was washed with acetic acid and water. Thus naphthalenedicarboxylic acid was obtained.

To the naphthalenedicarboxylic acid, seven times thereof of methanol and one-half thereof of sulfuric acid were added, and the system was subjected to an esterification reaction at the reflux temperatures of methanol for 6 hours. Thereafter the insoluble matter was removed by filtration. The filtrate was cooled to 10° C., and the precipitated crystalline solid was recovered and washed with water to be removed of the sulfuric acid used as the catalyst.

Separately, from the filtrate remaining after the recovery of crystalline solid, a part of the methanol was removed, and thereafter the ester was extracted with chloroform. The already recovered crystalline solid and the extract liquid were combined and distilled under reduced pressures. Thus the fraction distilled at 225-240° C./7-10 mm. Hg was separated.

An autoclave equipped with a condenser was charged with 122 g. of the above-refined dimethyl ester of naphthalenedicarboxylic acid, 69 g. of ethylene glycol, 0.04 g. of manganese acetate tetrahydrate, and 0.04 g. of antimony trioxide, and the system was heated to 160-230° C. in nitrogen gas current. The methanol formed with the advance of ester-exchange reaction was distilled off. After the reaction, phosphorous acid was added, and the polymerization was carried out in nitrogen gas current first at atmospheric pressure for 30 minutes, at the bath temperature of 280° C. Thereafter the pressure was gradually reduced, and at 0.2-0.3 mm. Hg, the polymerization was continued until the intrinsic viscosity of the polyester reached 0.64, while withdrawing the ethylene glycol from the system. The "intrinsic viscosity" was calculated from the relative viscosity measured as to the polymer's solution in ortho-chlorophenol at 35° C.

The polymer was melt-spun, drawn, and heat-treated according to the conventional practices, to form filaments of the properties below: monofilament's denier, 4 de.; tenacity, 4.5-6 g./de.; and elongation, 10-25%.

Shrinkage of the filaments was measured at 180° C. (refer to JIS, L1070—1964 and L1073—1965).

(2) Qualitative evaluation of 2,7-DMN

The isomerization product was dissolved in four times thereof of methanol under heating, and cooled to 5° C. The precipitated crystalline solid was separated to provide a refined DMN.

The DMN was oxidized and esterfied similarly to the case of 2,6-DMN evaluation, to form a dimethyl ester of naphthalenedicarboxylic acid.

An autoclave was charged with 122 g. of the dimethyl ester, 83.6 g. of trimethylene glycol, and 0.05 g. of tetrabutyl titanate, and the system was subjected to the ester-exchange reaction and subsequently, polymerization reaction, to form a polymer having an intrinsic viscosity of 0.65.

The polymer was melt-spun, drawn, and heat-treated according to the conventional practices, and the filaments having a monofilament's denier of 4, tenacity of 2.8-5.0 g./de., and an elongation of 15-35% were obtained.

Also as to the same filaments, shrinkage was determined at 150° C.

In the specification, the term "toughness" refers to the filaments' tenacity (g./de.) ×elongation (percent). Low toughness values denote that the filaments are weak and broken easily.

Also the "heat stability" values were calculated as follows:

$$\text{Heat Stability (percent)} = \left[1 - \frac{X-S}{S}\right] \times 100$$

in which X and S respectively stands for the thermal shrinkage of the sample to be evaluated, and that of the standard sample. Thus, S is 3.3% as to polyethylenenaphthalene-2,6-dicarboxylate, and 8.1% as to polytrimethylenenaphthalene-2,7-dicarboxylate. Greater values denote higher heat stability.

Examples 1–7 and Controls 1–7

A stainless steel tubular reactor (10 mm. in diameter, and 2,000 mm. in length) was packed with 50 g. of a silica-alumina catalyst of which 90% by weight had the particle sizes ranging from 12 to 16 mesh (silica:alumina=87:13). A dimethylnaphthalene mixture of the composition below,

| | Mol percent |
|---|---|
| 1,5-DMN | 46.1 |
| 1,6-DMN | 35.7 |
| 2,6-DMN | 8.2 |
| MN | 5.2 |
| TMN | 4.8 |
| Other DMN's | 0.0 | was dropped into the reactor at a rate of 20 g./hour, while nitrogen gas was passed therethrough at a rate of 0.3 liter/min. at normal temperature and pressure. The reaction was performed at 295° C., to form the isomerization reaction product of the following composition:

| | Mol percent |
|---|---|
| 1,5-DMN | 12.5 |
| 1,6-DMN | 38.1 |
| 2,6-DMN | 36.5 |
| MN | 6.5 |
| TMN | 6.2 |
| Other DMN's | 0.2 |

The reaction was repeated in the above-described manner, except that the particle size of the catalyst and reaction temperature were varied for each run. The results were as given in Table 1 below.

was dropped at a rate of 25 kg./hour. Concurrently hydrogen gas was passed through the reactor at a rate of

TABLE 1

| Run number | Silica alumina-catalyst's particle size (mesh) | Reaction temperature (° C.) | Conversion (percent) | Selectivity (percent) | Adaptability as polyester-forming material | |
|---|---|---|---|---|---|---|
| | | | | | Heat stability (percent) | Toughness (g./de. percent) |
| Example 1 | 90% 12-16<br>10% 4-6 | 295 | 92.8 | 94.1 | 97 | 142 |
| Control 1 | 70% 12-16<br>30% 4-6 | 295 | 89.6 | 89.7 | 79 | 85 |
| Control 2 | 90% 4-6<br>10% 12-16 | 295 | 85.3 | 86.7 | 64 | 75 |
| Example 2 | 90% 35-60<br>10% 4-6 | 295 | 102.1 | 94.4 | 100 | 144 |
| Example 3 | 90% 115-150<br>10% 4-6 | 295 | 103.2 | 95.3 | 100 | 147 |
| Control 3 | 70% 12-16<br>30% 150-170 | 295 | 101.3 | 88.5 | 73 | 88 |
| Example 4 | 95% 12-16<br>5% 4-6 | 340 | 97.8 | 92.2 | 94 | 130 |
| Control 4 | 95% 12-16<br>5% 4-6 | 380 | 99.8 | 82.8 | 49 | 63 |
| Example 5 | 95% 12-16<br>5% 4-6 | 270 | 94.2 | 95.1 | 97 | 143 |
| Control 5 | 95% 12-16<br>5% 4-6 | 250 | 88.3 | 92.2 | 79 | 115 |
| Example 6 | 85% 115-150<br>15% 4-6 | 340 | 101.6 | 93.2 | 94 | 132 |
| Control 6 | 85% 115-150<br>15% 4-6 | 380 | 103.1 | 81.5 | 45 | 65 |
| Example 7 | 85% 115-150<br>15% 4-6 | 270 | 98.1 | 94.7 | 100 | 143 |
| Control 7 | 85% 115-150<br>15% 4-6 | 250 | 86.3 | 91.2 | 79 | 115 |

Examples 8-14 and Controls 8-14

The same tubular reactor as employed in Example 1 was packed with a silica-alumina catalyst of which 90% by weight was composed of the particles of 12-16 mesh in size, and 10% by weight, of the particles of 4-6 mesh (silica:alumina=50:50). Into the reactor a naphthalene mixture of the following composition:

| | Mol percent |
|---|---|
| 1,7-DMN | 74.4 |
| 2,7-DMN | 13.7 |
| MN | 6.9 |
| TMN | 5.0 |

0.3 liter/min., at normal temperature and pressure, and the reaction was effected at 300° C. Thus an isomerization reaction product of the following composition was obtained:

| | Mol percent |
|---|---|
| 2,7-DMN | 42.3 |
| 1,7-DMN | 42.7 |
| MN | 8.3 |
| TMN | 6.5 |
| Other DMN's | 0.2 |

The above Example 8 was repeated except that the sizes of catalyst particles and reaction temperature were varied for each run. The results were as given in Table 2.

TABLE 2

| Run number | Silica-alumina catalyst's particle size (mesh) | Reaction temperature (° C.) | Conversion (percent) | Selectivity (percent) | Adaptability as polyester-forming material | |
|---|---|---|---|---|---|---|
| | | | | | Heat stability (percent) | Toughness (g./de. percent) |
| Example 8 | 90% 12-16<br>10% 4-6 | 300 | 99.4 | 94.2 | 97 | 136 |
| Control 8 | 70% 12-16<br>30% 4-6 | 300 | 89.7 | 89.3 | 80 | 86 |
| Control 9 | 90% 4-6<br>10% 12-16 | 300 | 88.2 | 86.3 | 73 | 76 |
| Example 9 | 90% 35-60<br>10% 4-6 | 300 | 101.7 | 94.3 | 97 | 135 |
| Example 10 | 90% 115-150<br>10% 4-6 | 300 | 102.3 | 93.2 | 96 | 126 |
| Control 10 | 70% 12-16<br>30% 150-170 | 300 | 100.8 | 87.5 | 74 | 76 |
| Example 11 | 90% 12-16<br>10% 4-6 | 340 | 100.5 | 92.1 | 93 | 112 |

TABLE 2—Continued

| Run number | Silica-alumina catalyst's particle size (mesh) | Reaction temperature (° C.) | Results | | Adaptability as polyester-forming material | |
|---|---|---|---|---|---|---|
| | | | Conversion (percent) | Selectivity (percent) | Heat stability ness (percent) | Toughness (g./de. percent) |
| Control 11 | 90% 12-16<br>10% 4-6 | 380 | 101.5 | 83.6 | 66 | 53 |
| Example 12 | 90% 12-16<br>10% 4-6 | 270 | 100.7 | 94.5 | 97 | 136 |
| Control 12 | 90% 12-16<br>10% 4-6 | 250 | 89.1 | 90.2 | 82 | 92 |
| Example 13 | 85% 115-150<br>15% 4-6 | 340 | 102.4 | 93.8 | 96 | 132 |
| Control 13 | 85% 115-150<br>15% 4-6 | 380 | 102.5 | 84.7 | 68 | 60 |
| Example 14 | 85% 115-150<br>15% 4-6 | 270 | 98.3 | 94.7 | 97 | 138 |
| Control 14 | 85% 115-150<br>15% 4-6 | 250 | 87.1 | 91.2 | 87 | 98 |

Controls 15 and 16

Example 1 was repeated, except that the use of nitrogen gas was omitted (Control 15). Also, Example 8 was repeated except hydrogen gas was omitted (Control 16). The results are given in Table 3 below, together with those of Examples 1 and 8.

TABLE 3

| Run number | Conversion (percent) | Selectivity (percent) | Adaptability as polyester-forming material | |
|---|---|---|---|---|
| | | | Heat stability (percent) | Toughness (g./de. percent) |
| Example 1 | 92.8 | 94.1 | 97 | 142 |
| Control 15 | 25.7 | 83.2 | 45 | 63 |
| Example 8 | 99.4 | 96.2 | 97 | 136 |
| Control 16 | 26.1 | 84.7 | 61 | 60 |

Control 17

Example 1 was repeated, except that the composition of starting dimethylnaphthalene mixture employed was as follows:

| | Mol percent |
|---|---|
| 1,5-DMN | 34.1 |
| 1,6-DMN | 32.6 |
| 2,6-DMN | 8.3 |
| TMN | 25.0 |

Note that the trimethylnaphthalene content was as high as 25.0 mol percent. As the result, the conversion was 72.4%, the selectivity was 52.8%, and the heat stability and toughness were, respectively 3% and 50.3 g./de. percent, showing less adaptability as a polyester-forming material.

Example 15

A stainless steel tubular reactor of 10 mm. in diameter and 4000 mm. in length was packed with 100 g. of silica-alumina of which 90% by weight had the particle sizes ranging from 12 to 16 mesh and 10% by weight had those ranging from 5 to 12 mesh (silica:alumina=87:13), and heated to 300° C. Whereupon a starting mixture of the composition as specified in Table 4 was sent into the reactor at a rate of 40 g./hour (SV=0.4), together with dry nitrogen gas which was fed at a rate of 0.5 liter/min., from an upper part of the reactor, to perform the isomerization reaction. The product was cooled to 10° C., and the precipitated crystalline solid was separated. The remaining mother liquor was distilled under reduced pressure. The initial fraction of distillate obtained at the temperature up to 135° C. at 23 torr, and the last fraction of distillate obtained after the temperatures not lower than 145° C. at 23 torr, were discarded. 1,5-Dimethylnaphthalene was added to the main fractions to adjust its composition so as to make its methylnaphthalene and trimethylnaphthalene contents each not higher than 3%, and ratios of 1,6-dimethylnaphthalene and 1,5-dimethylnaphthalene approximately equal. The formed mixture was recycled into the reactor as the starting mixture. Through the similar procedures, the starting material was recycled three times, with the results as shown in Table 4 below. In all of the three runs the ratio of 2,7-dimethylnaphthalene to 2,6-dimethylnaphthalene in the crystals was not greater than 0.5 mol percent. Incidentally, the numerical values given in Table 4 are those of mol percent.

TABLE 4

| | First run | | Second run | | Third run | |
|---|---|---|---|---|---|---|
| | Material | Product | Material | Product | Material | Product |
| 2,6-DMN | 7.1 | 38.6 | 5.7 | 40.1 | 6.0 | 40.3 |
| 2,7-DMN | 0.1 | 0.2 | 0.1 | 0.2 | 0.1 | 0.2 |
| 1,6-DMN | 41.5 | 39.1 | 42.8 | 41.0 | 42.4 | 41.6 |
| 1,5-DMN | 41.2 | 8.8 | 45.0 | 8.9 | 45.6 | 8.6 |
| Other DMN | 0.1 | 0.2 | 0.1 | 0.2 | 0.1 | 0.1 |
| MMN | 4.5 | 6.0 | 3.3 | 5.0 | 3.0 | 4.7 |
| TMN | 5.5 | 7.1 | 3.0 | 4.6 | 2.8 | 4.5 |
| 2,7-DMN to 2,6-DMN | | 0.5 | | 0.5 | | 0.5 |
| Conversion (percent) | | 99.2 | | 99.0 | | 99.0 |
| Selectivity (percent) | | 92.6 | | 92.4 | | 92.2 |
| Heat stability (percent) | | 94 | | 94 | | 94 |
| Toughness (percent) | | 134 | | 132 | | 132 |

Example 16

A steel tubular reactor of 15 mm. in diameter and 40,000 mm. in length was packed with 250 g. of a silica-alumina catalyst of which 90% by weight are composed of the particles of 12–16 mesh, and 10% by weight, of the particles of 4–6 mesh (silica:alumina=87:13). Through the reactor dry nitrogen gas of 0.6 l./min. at normal temperature and pressure was passed, as heated to 295° C. Concurrently, 1,5-dimethylnaphthalene was fed into the reactor from an upper portion thereof, at a rate of 100 g./hour at 295° C., to perform the isomerization reaction.

After 20 hours' continuous running, some reduction in reactivity was observed, and the temperature was raised by 5° C. Thereafter at every 20 hours the reaction temperature was raised by 5° C., until it reached 340° C. The total reaction product obtained through the eight days' operation was analyzed. The conversion on the average was 95.1%, the selectivity was 93.1%, and the adaptability as a polyester-forming material was 94% in heat stability, and 131 g./de. percent in toughness.

We claim:

1. A process for isomerizing dimethylnaphthalenes by contacting the same as dispersed in a carrier gas with silica-alumina catalyst at vapor phase under elevated temperatures, characterized in that the dimethylnaphthalene are contacted with the catalyst of which at least 80% by weight have the particle sizes ranging from 7 to 150 mesh, at the temperatures ranging from 260 to 350° C.

2. The process of Claim 1, in which at least 80% by weight of the starting dimethylnaphthalene is selected from at least one member of the group consisting of 2,6-, 1,6- and 1,5-dimethylnaphthalene.

3. The process of Claim 1, in which the alumina content of the silica-alumina catalyst ranges from 0.5 to 80% by weight.

4. The process of Claim 1, in which the temperature ranges from 280 to 340° C.

5. The process of Claim 1, in which the trimethylnaphthalene content of the dimethylnaphthalenes in the reaction zone is not greater than 10 mol percent.

6. The process of Claim 1, in which the carrier gas is used in the amount of from 0.3 to 200 molar times to the dimethylnaphthalenes.

7. The process of Claim 1, in which the feed rate of the dimethylnaphthalenes is 0.1 to 10 times by weight of the catalyst per hour.

8. The process of Claim 1, in which at least 80% by weight of the starting dimethylnaphthalene is selected from at least one member of the group consisting of 2,7-, 1,7-, and 1,8-dimethylnaphthalene.

9. The process of Claim 1, wherein the particle size of said silica-alumina catalyst is within the range of 12 to 16 mesh.

10. The process of Claim 1, wherein the particle size of said silica-alumina catalyst is within the range of 35 to 60 mesh.

11. The process of Claim 1, wherein the particle size of said silica-alumina catalyst is within the range of 115 to 150 mesh.

References Cited
UNITED STATES PATENTS

| | | | |
|---|---|---|---|
| 3,647,898 | 3/1972 | Brodbeck | 260—668 A |
| 3,116,341 | 12/1963 | Sheppard et al. | 260—668 F |
| 3,215,749 | 11/1965 | Johnson et al. | 260—668 F |
| 3,235,615 | 2/1966 | Allen et al. | 260—668 F |
| 3,249,644 | 5/1966 | Hahn | 260—668 F |
| 3,336,411 | 8/1967 | Benham | 260—668 F |

CURTIS R. DAVIS, Primary Examiner

U.S. Cl. X.R.

260—668 F